US007873175B2

(12) United States Patent
Pocino et al.

(10) Patent No.: US 7,873,175 B2
(45) Date of Patent: Jan. 18, 2011

(54) MULTIPLEXED MICROPHONE SIGNALS WITH MULTIPLE SIGNAL PROCESSING PATHS

(75) Inventors: Michael Pocino, Marietta, GA (US); Steve Joiner, Avondale Estates, GA (US); Craig Richardson, Marietta, GA (US); Kwan Truong, Lilburn, GA (US)

(73) Assignee: Polycom, Inc., Pleasanton, CA (US)

( * ) Notice: Subject to any disclaimer, the term of this patent is extended or adjusted under 35 U.S.C. 154(b) by 1352 days.

(21) Appl. No.: 11/318,784

(22) Filed: Dec. 27, 2005

(65) Prior Publication Data

US 2007/0147627 A1 Jun. 28, 2007

(51) Int. Cl.
*H04R 3/00* (2006.01)
*H04B 3/00* (2006.01)

(52) U.S. Cl. ........................................ 381/122; 381/80

(58) Field of Classification Search ................. 381/122, 381/77, 81–85, 76, 123, 71.1, 94.1; 700/94
See application file for complete search history.

(56) References Cited

U.S. PATENT DOCUMENTS

| | | | | |
|---|---|---|---|---|
| 5,848,164 | A * | 12/1998 | Levine | 381/61 |
| 6,868,377 | B1 * | 3/2005 | Laroche | 704/205 |
| 7,092,532 | B2 * | 8/2006 | Luo et al. | 381/93 |
| 2002/0090092 | A1 * | 7/2002 | Aarts et al. | 381/80 |

* cited by examiner

*Primary Examiner*—Curtis Kuntz
*Assistant Examiner*—Hai Phan
(74) *Attorney, Agent, or Firm*—Wong, Cabello, Lutsch, Rutherford & Brucculeri LLP

(57) ABSTRACT

A multiplexed microphone signal with multiple signal processing paths is disclosed. Each signal processing path has it own priority and other characteristics. A signal path is selected based on the application of the processed signal. Similar processes within different paths may be shared to reduce computation workload.

34 Claims, 7 Drawing Sheets

MULTIPLEXED MICROPHONE SIGNALS WITH MULTIPLE SIGNAL PROCESSING PATHS

BACKGROUND OF THE INVENTION

1. Field of the Invention

This invention relates generally to microphone audio signal processing, particularly related to multiplexed microphone signals with multiple signal processing paths.

2. Description of the Related Art

A microphone is a basic and essential element in an audio system. There are many different applications to a variety of audio systems. The most common audio systems include, at least, the following types: a teleconference system, a public addressing (PA) system, a recording studio, or some combination of the above three.

A simplest teleconference system is a telephone. Two people at two physically separate locations may talk to each other through a telephone network and two telephone sets. FIG. 1 illustrates a simplest teleconference system 100. The teleconference system 100 has two sites, a near site and a far site. At each site, there is a telephone, 110 and 150 respectively. The two telephones are connected through a network 130, typically a Public Switched Telephone Network (PSTN), sometime referred to as Plain Old Telephone Service (POTS). The near site telephone 110 has at least a microphone 102 and a loudspeaker 104. Typically, the telephone also has a circuitry or processor module 106 to perform some signal processing. For example, most touch-tone phones can make different tones to represent different number keys, making artificial ring tones that can be changed by a user. The telephone 150 at the far site may or may not have the same components at in the telephone 110. For simplicity, it is assumed that the telephone 150 has at least a microphone 152, a loudspeaker 154 and a processing module 156.

In a more advanced telephone, the processor module 106 may have more circuitry or more processing power to perform many functions. One state of the art telephone is a Polycom SoundStation® VTX-1000 speakerphone, available from the assignee of the current invention. The VTX-1000 has many more features and functions. For example, it is a speakerphone that allows full-duplex mode of operation. In full-duplex mode, talkers at both sites of the conference call can speak at the same time. To allow full-duplex mode of operation, the VTX-1000 has an advanced acoustic echo canceller (AEC). Without an AEC, annoying echo-like sounds will circulate between the two sites. If AEC is not implemented, then the speech signal 172 from a talker at the far site is transmitted through the network 130 to the near site telephone 110 as signal 134. The speech signal 134 is reproduced by the loudspeaker 104. Since the telephone is operating in full-duplex mode, the microphone 102 is active when loudspeaker 104 is working. The microphone 102 generates a signal 132, which contains contributions due to the far end speech signal 172 from the loudspeaker 104. This far end signal embedded in signal 132 is transmitted back to the far end together with the near site speech signal also in signal 132. The entire signal 132 becomes a loudspeaker signal 174 at the far end and reproduced by loudspeaker 154. This way, the far end talker will hear his voice back from the loudspeaker 154, like an echo. This echo speech signal produced by the loudspeaker 154 can again be picked up by microphone 152, transmitted through network 130, reproduced by loudspeaker 104, picked up by microphone 102 and transmitted back to loudspeaker 154. If nothing is done to it, the echo signal can circulate between the two sites for a long time until dissipated into background noise, which is increased due to such echoes. Without AEC, full-duplex mode operation in a speakerphone is not practical due to the echoes and the noise.

When a process module 106 performs echo cancellation, it estimates the contribution of echo in the microphone signal 132 and subtracts that portion from the microphone signal 132. This way, signal 132 only contains signals due to the speech of near site talkers. Therefore, what a far end talker can hear is the speech of near site talkers alone, without echo of his own voice. At the far end, another process module 156 may perform the similar acoustic echo cancellation. To achieve optimal goal of solving the echo problem, besides acoustic echo cancellation, echo suppression and noise fill may also be used. That is to minimize the residual echo heard by participants at the far site.

The process modules 106 and 156 may also perform other audio signal processing. For example, such processing may include parametric equalization. A particular microphone element may not respond to sound with uniform gain for all frequencies. To compensate for this non-uniformity, the process module may apply different filters on different frequencies to enhance or attenuate the frequency to achieve the uniform gain across the spectrum. The process module may also adjust the gain to change the characteristic of the speech or to achieve other acoustic objectives.

The process modules may also include automatic gain control (AGC) to accommodate the different loudness of speech from different talkers. There are various factors that may affect the gain of a microphone to speech, such as the loudness of the talker, the distance between the talker and the microphone or the orientation of the microphone and the talker. The use of AGC can avoid the wide fluctuation of the speech reproduced by a loudspeaker.

Another application of microphone signals is a public addressing system or a sound reinforcement system, as illustrated in FIG. 2. Such a system is typically used in theatres, auditoriums or large classrooms. One of the main differences of system 200 and system 100 is that system 200 is typically used at one site. The microphone 202 and loudspeaker 204 are located at the same general location such that sound from the loudspeaker 204 is picked up by the microphone 202. The microphone 202, process module 206 and loudspeaker 204 can form a closed loop. Unlike system 100, system 200 does not have two sites and cannot have the echo problem. There is no need for acoustic echo cancellation. But it has its own problem, a feedback problem. If the closed loop has an overall gain above unity for a particular frequency, then for that frequency, system 200 has a positive feedback loop which reinforces itself until it makes a very loud squeaky noise, typically referred to as howling. The howling is very disruptive to meetings, lectures or artistic performances. It may also be destructive to acoustic equipment involved in the loop. Eliminating or avoiding feedback is a major concern in making and operating an audio reinforcement system 200. In doing so, a slight degradation of the acoustic performance is acceptable. A typical method for eliminating feedback is to reduce the overall gain below unity for all frequencies. This may limit the amount of amplification in the reinforcement system, which is the main purpose of using such a system in the first place. More advanced methods to avoid feedback can dynamically detect and attenuate only the frequency that is likely to cause the howling, while keeping the gain for other frequencies intact, i.e., the gain for other frequencies possibly can be above unity. The selective attenuation of some frequencies can affect the sound quality, due to the missing portion of the spectrum and the artificial distortion.

As illustrated in FIG. 2, process module 206 may also perform many microphone signal processes 212, including parametric equalization (PEQ), noise cancellation (NC), feedback elimination (FBE), dynamic process compression (DP), automatic gain control (AGC), and automatic mixing (AM). After performing desired processes on the microphone signal, the signal may be amplified by an amplifier 214 to form a loudspeaker signal 234. Loudspeaker signal 234 is reproduced by a loudspeaker 204.

FIG. 3 illustrates another system 300, typically used in sound recording studios, radio broadcasting stations or court recorders. System 300 has a microphone 302, a process module 306 and a recorder or other equipment 304. The main difference between system 300 and systems 100 and 200 discussed earlier is that there is no closed loop in system 300. The microphone 302 generates a signal 332, processed by process module 306, sent to recorder 304 (or other equipment for signal disposal) and that is the end of the system. There is no feedback from the processed signal to microphone 302. Therefore, there is no need to perform some of the processes discussed in systems 100 and 200, namely the echo cancellation, echo suppression and feedback elimination. Without the limitations imposed by the AEC and FBE processes, system 300 is typically focused on achieving the best sound quality possible, which is a requirement in a typical sound recording studio for recording a music performance or for a radio broadcasting stations for transmitting a live performance. When such a system is used for a court recorder, reliability is paramount, i.e., all words spoken or sounds must be recorded. In a typical system 300, the microphone signal processes 312 may include PEQ, NC, DP and AGC etc.

SUMMARY OF THE INVENTION

As discussed above, different applications of microphone signals may require different processes. Some of the processes are similar, for example, most of the systems use AGC and PEQ. Some processes are different, for example AEC, FBE etc. Some processes necessary for one application may be in conflict with the purpose of another application. For example, feedback elimination is necessary for sound reinforcement application, but can degrade the acoustic quality. Feedback elimination should not be used in a sound recording application.

For clarity, systems 100, 200 and 300 are described separately and apply to different applications. But in actual applications, these systems may be used together in a single setting. For example, in a distance learning application as illustrated in FIG. 5, there is a local site and a far site. A professor is speaking at the local site. Students at both the local site and the far site can ask questions or otherwise interact with each other and the professor. The lecture is also recorded for use by students who do not have access to either the local classroom or a teleconference unit. In this case, the teleconference between the local site and the far site prefers the use of a conference system, similar to system 100 as shown in FIG. 1. But the interaction between the professor and the students at the local site prefers a sound reinforcement system as shown in FIG. 2 such that speech of the professor and questioning student can be heard by all people. The recording for non-participating students prefers a recording system 300 as shown in FIG. 3. The currently available audio systems cannot satisfy all desires for the three applications. Most of the time, only one of the desires is satisfied and the other two desires are ignored. Sometimes, none of the desired goals is achieved.

Currently, even if a microphone system or audio system is installed for one particular application, the system still has to be modified or adjusted extensively for that particular application. It is time consuming, costly and confusing. To custom-manufacture or configure a microphone system or audio system useful for only one particular application is possible, but it increases the cost and is not desirable.

It is more to desirable have a system or method that can adapt to a particular application easily. It is very desirable to have a system that can accommodate all application goals at the same time and avoid the apparent conflicts between them.

The current invention uses a process module that can route a microphone signal to different processing paths. Each path is customized to achieve the goal for a particular application. The identical processes within different paths may be performed by the same process module to avoid duplication and save processing power. When installing the system, a process path is selected for a particular application. No complicated configuration is required. All potentially conflicting processes are accommodated within the same processor.

BRIEF DESCRIPTION OF THE DRAWINGS

A better understanding of the invention can be obtained when the following detailed description of the preferred embodiment is considered in conjunction with the following drawings, in which.

DESCRIPTION OF THE PREFERRED EMBODIMENT

The current invention includes devices and methods to multiplex microphone signals, where each signal is used for a particular application. Each signal path is independent from another signal, so conflicting signal processes may be applied for the different signals. Some processes are used in several signal paths, then such processes may be shared among the signal paths.

Figure 1:
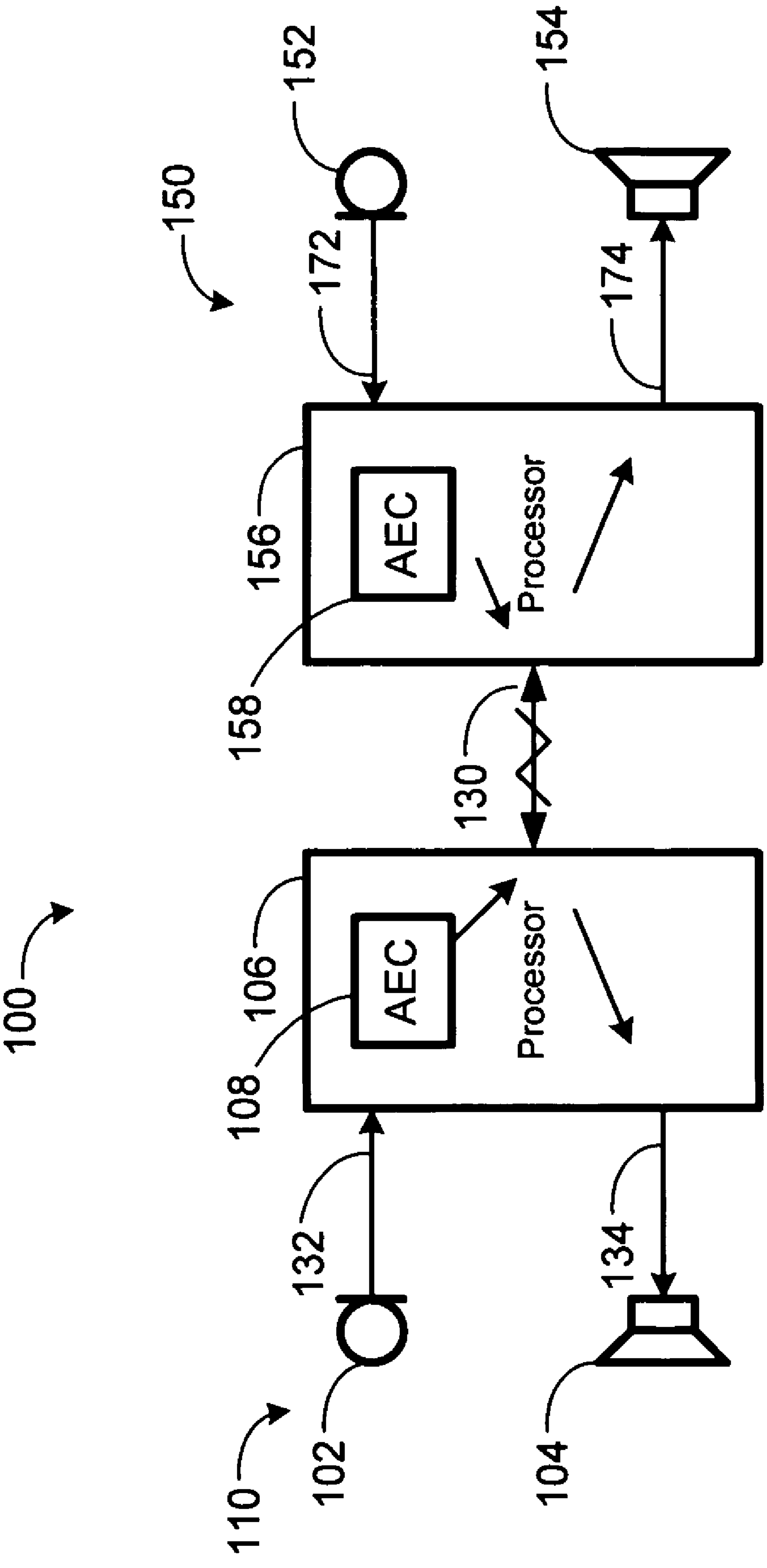
Figure 1 (Prior art)
FIG. 1 illustrates a prior teleconference system.
Figure 2:
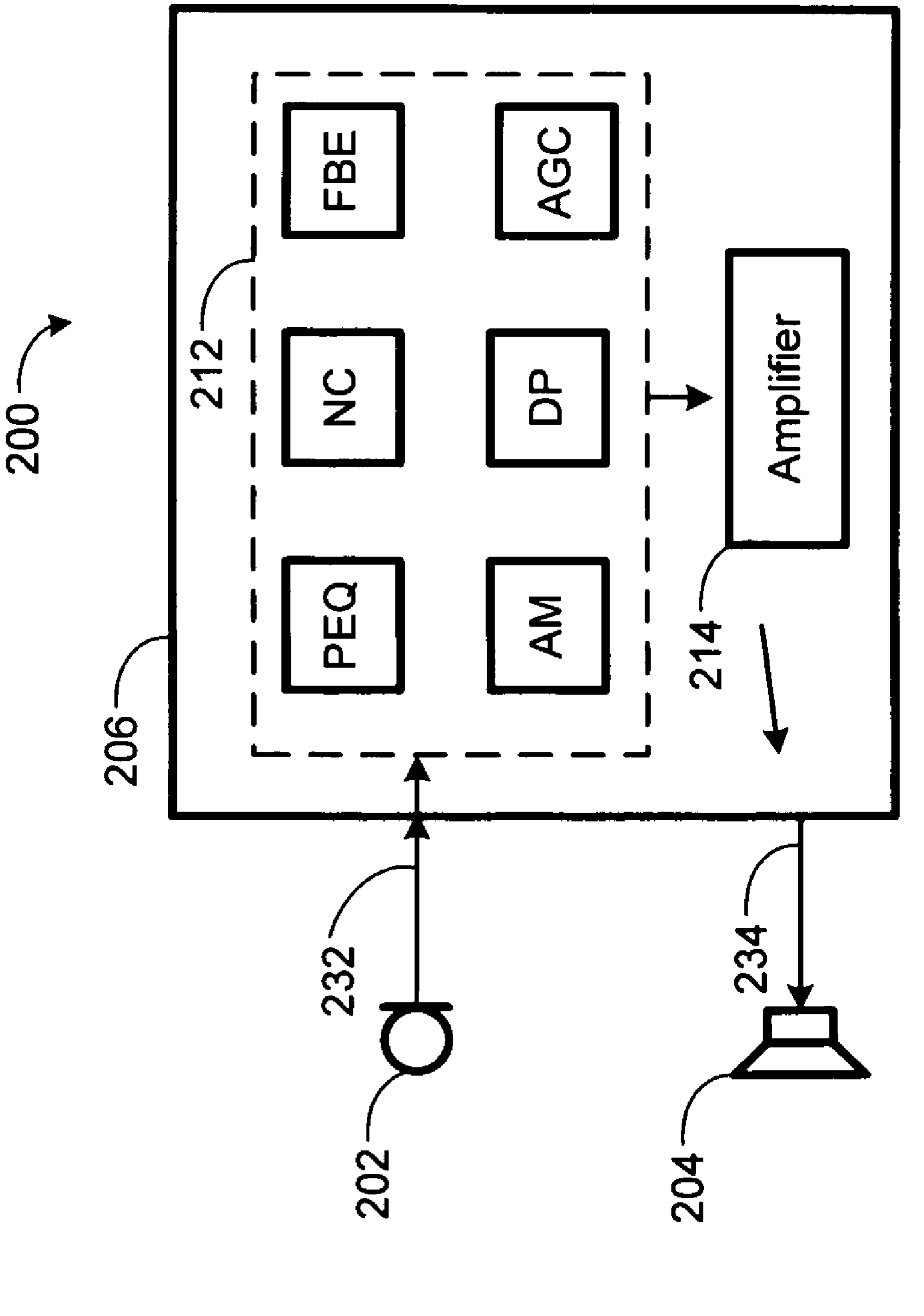
Figure 2 (Prior art)
FIG. 2 illustrates a prior art sound reinforcement system.
Figure 3:
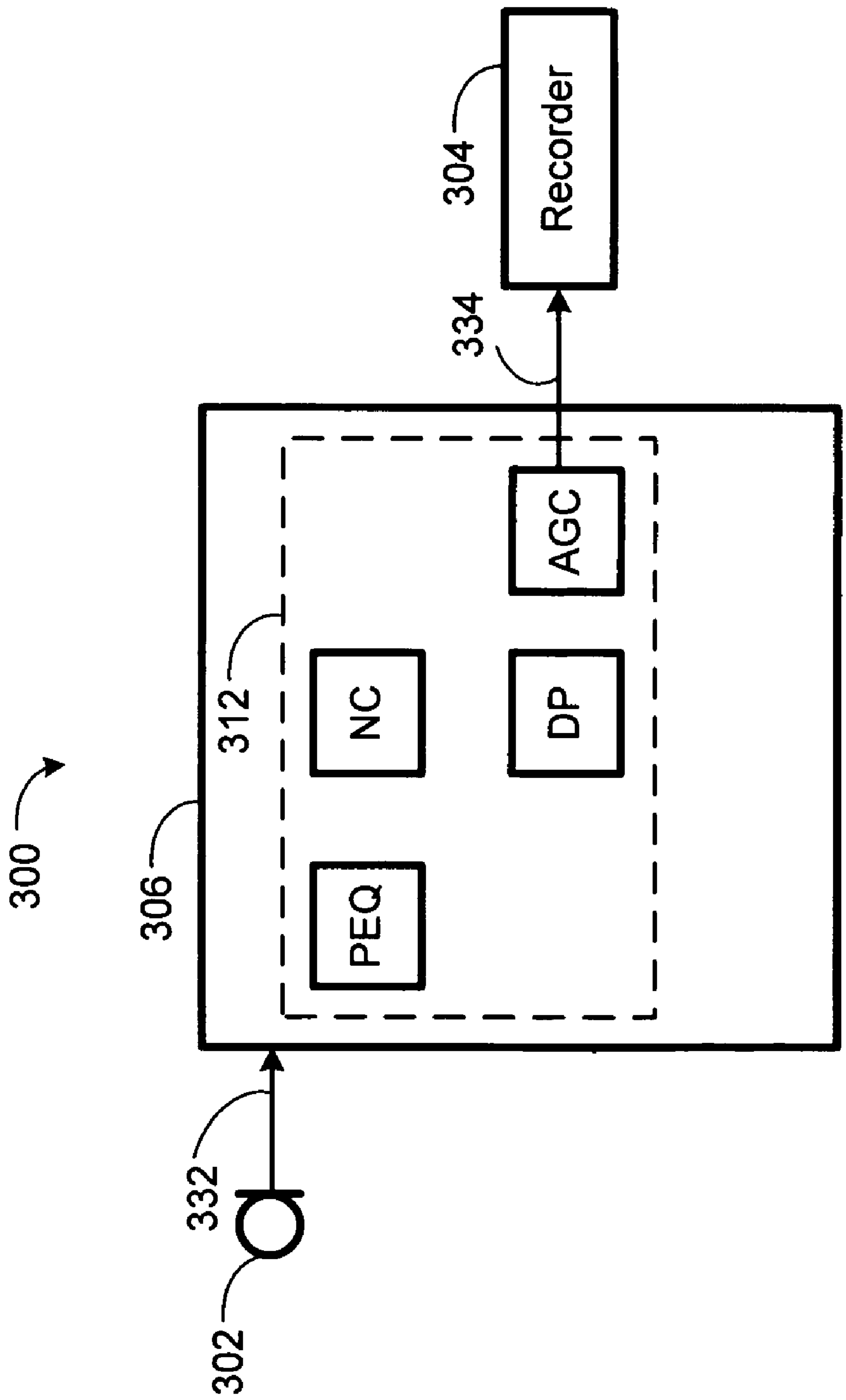
Figure 3 (Prior Art)
FIG. 3 illustrates a prior art sound recording system.
Figure 4:
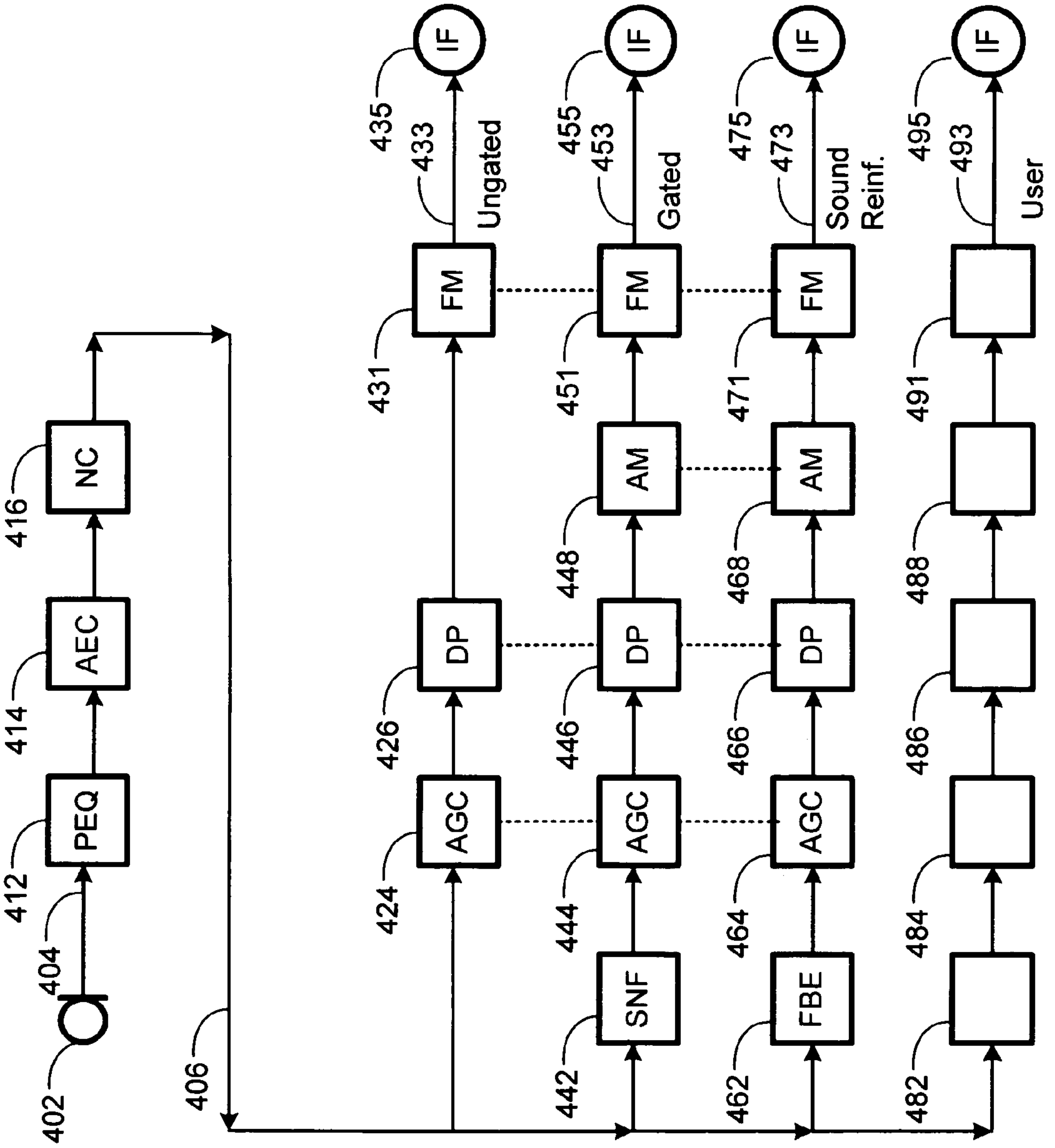
FIG. 4 illustrates a microphone processing system according to an embodiment of the current invention.

FIG. 4 illustrates one embodiment of the current invention. A microphone 402 generates microphone signal 404. The signal is processed by parametric equalizer (PEQ) 412, acoustic echo cancellation (AEC) 414 and noise cancellation (NC) 416. These processes are common in all applications. Accordingly, they are shared among all signal processing paths. The resulting signal is 406. Then the signal processing path splits into several paths. In this example, four paths are shown: an ungated path, a gated path, a sound reinforcement path and a user defined path, as denoted by the output signals 433, 453, 473 and 493. The ungated path includes auto gain control (AGC) 424, dynamic process compression (DP) 426 and fader mute (FM) 431. The gated path includes echo suppression and noise fill (SNF) 442, AGC 444, DP 446, automatic microphone mixing (AM) 448 and FM 451. Similarly, the sound reinforcement path includes feedback elimination (FBE) 462, AGC 464, DP 466, AM 468 and FM 471. The customized path may have some of the above mentioned processes or user customized processes 482, 484, 486, 488 and 491. This path allows a user of the system to mix and match pre-defined processes. It also allows the user to create his unique processes. It is noted that AGC 424, 444 and 464, DP 426, 446 and 466, AM 448 and 468, and FM 431, 451 and 471 are similar process in each path, so the processor is the same among the different paths and is shared among them. This way, computational power is shared by the different paths.

The ungated signal 433 is configured to be used in an open-loop system, such as a sound recording system. The signal 433 is processed to achieve the highest quality and reliability. Any sound picked up by the microphone 402 is presented at signal 433 with high fidelity. Typically, only one or a few microphone signals are mixed for each output 433. Signal 433 may be recorded by a high quality sound recorder or broadcasted to others.

A second path generates a gated signal 453. The gated signal 453 is configured to be used in a closed-loop system, more particularly, a conferencing system. The echo suppression and noise fill process (SNF) 442 complements an AEC 414 to reduce echo heard by people at a far site. A noise fill is typically necessary to avoid dead silence at the far site, when people at the near site are not talking. Because of the echo suppression and noise fill process, the gain of the local microphone can vary dynamically depending on whether there are any people talking. In a conference setting, local speech is not reproduced in local loudspeaker, so it does not matter whether the gain varies. If a gated signal 453 is reproduced in a local loudspeaker, such as in a local sound reinforcement system, then the SNF 442-caused variation can be noticeable and sometimes annoying.

A third signal path generates a sound reinforcement signal 473. The sound reinforcement signal 473 is configured for use in a sound reinforcement system. SNF 442 is not used. The main reason for this is the doubletalk problem. In an audio conference, there are times when only people at one conference site are talking, i.e., single-talk, and there are times when people at more than one site are talking, i.e., doubletalk. SNF 442 works differently depending on whether there is single-talk or doubletalk in the conference. It is not a problem in a conference application, as discussed above related to the second signal path. But when the amplitude of local speech is reproduced by local loudspeakers, the fluctuation in the gain of the local speech can be noticeable and problematic. It is as if someone is mischievously turning the amplifier volume dial down or up as soon as you start speaking or stop speaking. By removing SNF 442, the associated doubletalk problem is eliminated. The gain of the speech remains stable. Instead, FBE 462 is used. FBE reduces the feedback problem by attenuating a frequency that the FBE predicts to be likely to cause howling. Because of this attenuation, the sound spectrum is artificially altered. The resulting sound quality is lower. The particular frequency which is attenuated may vary with time, so the overall degradation of the sound quality may be minor. Even so, at any particular time and at a particular frequency, the distortion can be substantial. If that particular frequency at that time is significant for some reason, then the signal 473 could be unacceptable. That is why signal 473 is not suitable for use in a court reporting application, where reliability is paramount.

In both the gated and sound reinforcement paths, automatic microphone mixing (AM) 448 and 468 are used. In a case of multiple microphones generating a single signal, an AM shuts off the microphone where no speech is detected and only opens the microphone where speech is detected. This way, noise signals from microphones that do not have speech signals are not mixed into the final speech signal. The SNR of the resulting mixed speech signal is improved. In a single signal processing situation, AM is essentially an on/off switch. When there is no speech signal detected at the microphone, the AM turns the signal off, such that the noise from this microphone is not supplied to downstream signal processing. When there is speech signal, then the signal is turned on and supplied to downstream processes. This improves signal quality for both versions. It improves gain before feedback in the sound reinforcement version. AM is not used in the ungated version to avoid possible attenuation of the local speech. And by definition, the ungated version is typically used for an application where there is minimum background noise (i.e. recording studio) or where all "noises" are, "signals" (i.e. court reporting).

FIG. 4 only illustrates the audio signal processing part of an audio system that is relevant to the current invention. Audio sinks for the output signals, i.e., the destinations of the various output signals, are not shown. The output signals may be transmitted to the various audio sinks through the interfaces 435, 455, 475 and 495. For each of the sinks, any of the several versions of the microphone signal may be selected. Although three of the output signals are processed and configured for three particular uses, they can be used for any purposes. Thus the audio sinks for the output signals can be many things that can accept audio signals, e.g., a loudspeaker, a conference unit at a far end site, a tape recorder, a radio transmitter, or other broadcast transmitter, etc.

Figure 5:
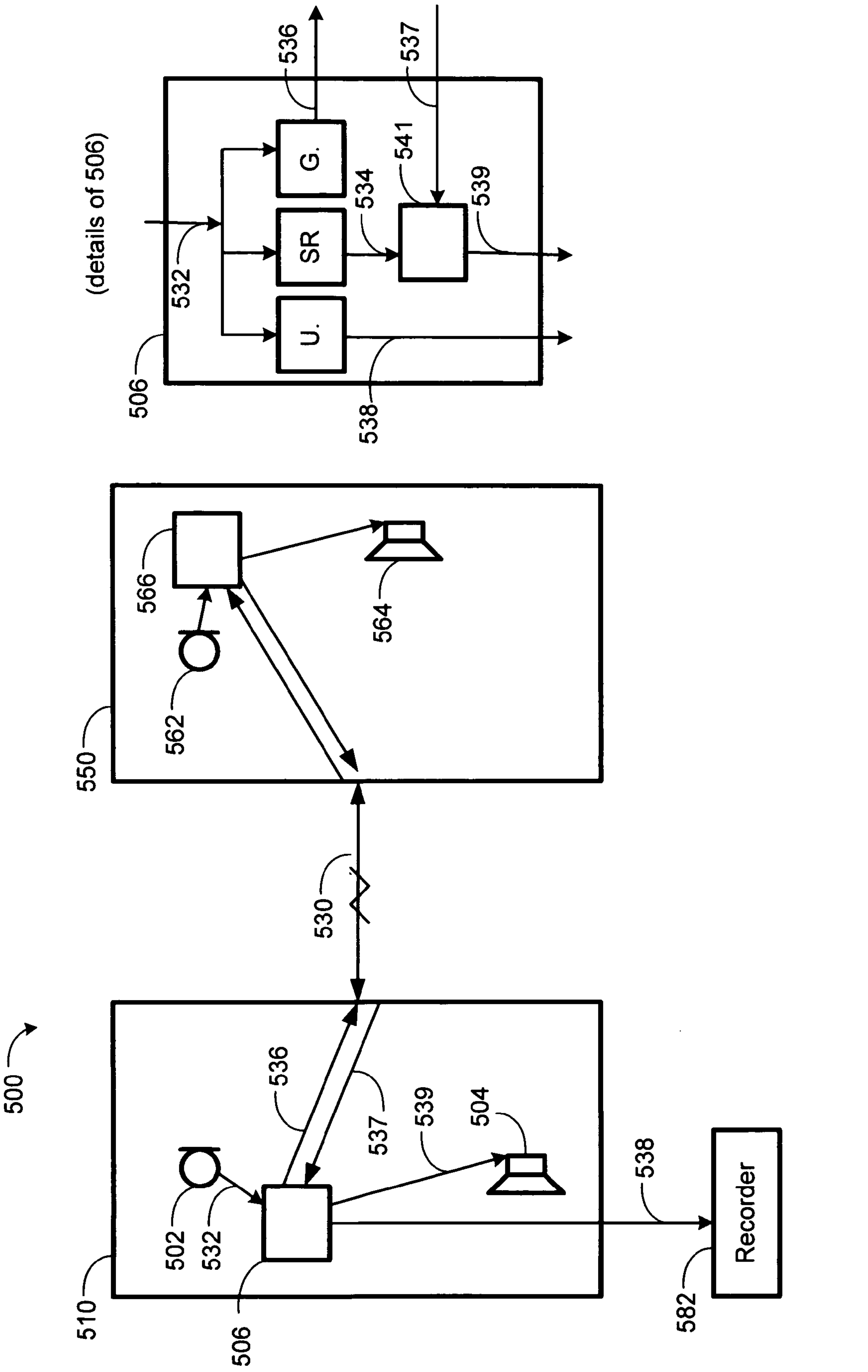
FIG. 5 illustrates a situation where all three applications are used.

Referring back to the setting illustrated in FIG. 5, the audio system 510 at the near site can employ the embodiment in FIG. 4. Using the embodiment of the current invention, the goal for each application can be achieved. The microphone signal 532 generated by microphone 502 is processed by a process module 506 as shown in FIG. 4, in three different paths for different applications. An ungated signal 538 is the output signal from the ungated path. It is recorded by recorder 582 for future use. In a court setting, the recorder 582 could be a court recorder.

The gated signal 536 is the output signal from the gated path. It is transmitted through a network 530 to the far site. This signal is substantially echo free.

The local sound reinforcement signal 534 is the output signal from the sound reinforcement path. It is combined with the loudspeaker signal 537 from the far site at a mixer 541 to form a local loudspeaker signal 539. Local loudspeaker signal 539 is reproduced by loudspeaker 504. So at the near site, both the local speech 532 and the far site speech 537 are amplified and can be heard by people at the near site of the conference.

The audio system 550 at the far site can be similar to the audio system 510 at the near site as discussed above, but it is not necessary. For example as shown in FIG. 5, system 550 may be a prior art conference unit. System 550 has a microphone 562, loudspeaker 564 and a process module 566. Since the audio system is only need to function as a conference unit, a prior art unit is sufficient. It is neither used for sound recording, nor for sound reinforcement. But if an audio system according to the current invention is available at the far site, then people at the far site would have the flexibility to add the two other functions that are available at the near site. If the far site has a system similar to the near site, then it can be used as a sound reinforcement system to accommodate many listeners at the far site. Also, it may record the lecture using its own recording device, instead of waiting for the near site to send the recording.

Figure 6:
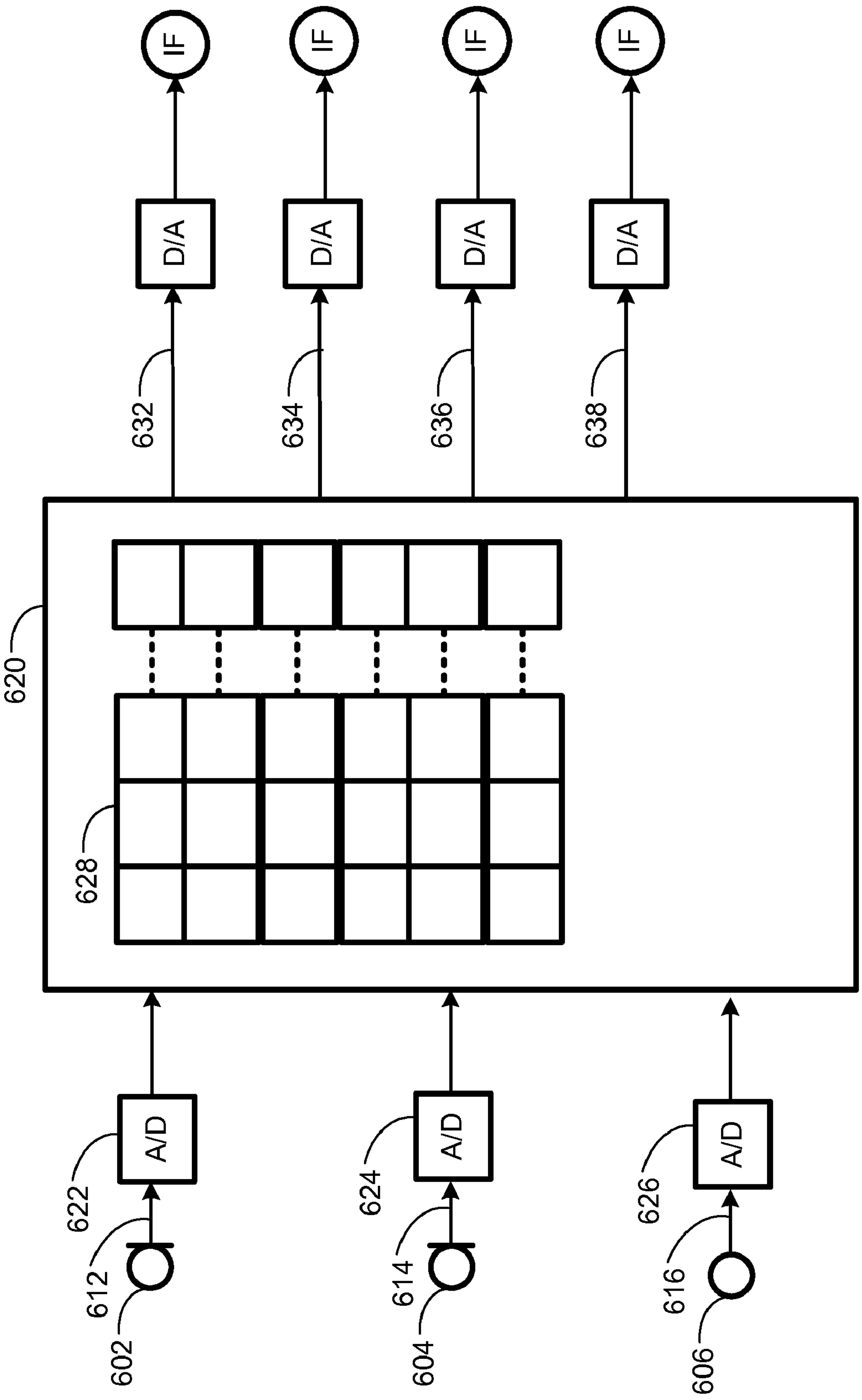
FIG. 6 illustrates a signal routing in one embodiment with multiple microphones.

Most of the data processes can be implemented in a single data processor, such as a DSP. FIG. 6 illustrates one embodiment that utilizes the capacity of a DSP to minimize the size and number of discrete components in an audio system. In this example, three input signals 612, 614 and 616 are shown, with four possible output signals 632, 634, 636 and 638. The input signals may come from various sources, such as microphones 602, 604 or a telephone network interface 606. The input signals are converted to digital signals from analog signals when necessary, for example by A/D converters 622, 624 or 626. Each signal can be processed by a DSP 620, which may perform many different processes, such as those discussed in reference to FIG. 4. Unlike many existing systems, each signal may be processed by the DSP 620 into different versions, such as discussed in reference to FIG. 4, i.e., ungated, gated or sound reinforcement versions. These different versions may be output as independent signals. For each of the audio sinks, any of the several versions of each source may be selected. For example, output signal 632 may be the gated version of signal 612; output signal 634 may be the sound reinforcement version of signal 612; output signal 636 may be an ungated version of signal 614; and output signal 638 may be a gated version of signal 616. Similarly, the output signals may be a combination of processed input signals. In another example, output signal 632 is a mixture of gated version of signal 612 and 614. Signal 634 is a mixture of ungated version of signal 616 and the sound reinforcement versions of signal 602 and 604. There are many other possible combinations. The system is very flexible to adapt to a particular need. One benefit of such a system is that most of the signal processing, such as signal routing and mixing, is performed in the digital domain within the DSP. No rewiring of electrical cables is necessary. The output signals can be sent via appropriate interfaces for desired applications.

In prior art systems that include an adequate DSP, the current invention can be practiced by changing the process module in an existing audio system or reprogramming the processor in such a system. Such an upgrade can expand the capabilities of audio systems at very small incremental cost.

Figure 7:
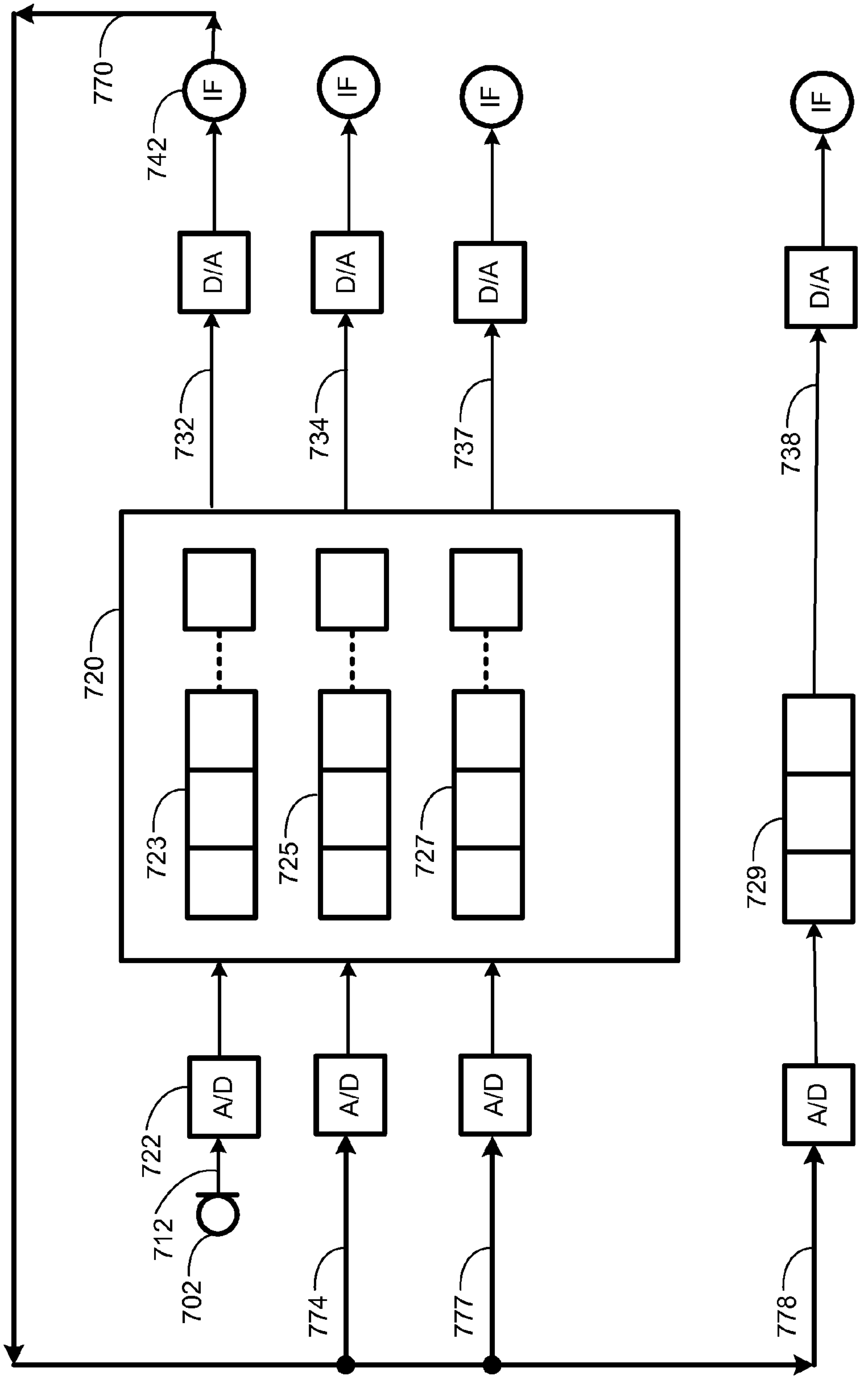
FIG. 7 illustrates another signal routing in an embodiment that makes use of an existing prior art audio system.

The current invention may also be practiced using a prior art system with limited capabilities, such as a Peavey Media Matrix and a Polycom Vortex conference unit. One such application is shown in FIG. 7. An audio system 720 has multiple inputs and multiple outputs. Each input may be independently processed and be sent out of the system. The system 720 includes some of the desired processes as discussed in FIG. 4. Others functions may be in other systems such as 729. When various systems are combined, then an equivalent system similar to that shown in FIG. 4 can be formed, where conflicting versions of a single signal may be created. In FIG. 7, microphone 702 generates a signal 712. Signal 712 is digitized when necessary by A/D converter 722. Signal 712 is processed by processor 723 in system 720, which performs parametric equalization and noise cancellation processes. The output signal 732 is sent out of interface 742 as signal 770 and fed back to the inputs of system 720. Signal 770 is split into three paths to make three versions, similar to those shown in FIG. 4. One path 774 is processed by processor 725 of system 720, which generates an ungated signal 734. The second signal 777 is processed by processor 727, which generates a gated signal 737. The third signal 778 is fed to another processor 729, outside of system 720. System 720 does not have a feedback elimination processor. So another system that has such capability is used. Process 729 generates a sound reinforcement signal 738. This way, using two systems and some wiring back and forth, three conflicting versions of the same input signal 712 are generated. This embodiment of the current invention is more cumbersome. It may reduce the number of signals that can be processed because it may use several processors to process one signal. But it does have the advantage of using existing equipment.

According to the embodiments of the current invention, a microphone signal can go through several different processing paths. Each path is configured for a particular application. Different paths share the common processes to reduce computation loads. The individual processes may also be combined differently by a user to make a customized signal processing for a highly specialized application. The above discussion has focused on three common audio system applications that are distinct. Sometimes they have conflicting objectives or priorities. There are many other applications and processes not mentioned here. The current invention, where a signal can go through different processing paths and sharing common processes, is still applicable to them.

While illustrative embodiments of the invention have been illustrated and described, it will be appreciated that various changes can be made therein without departing from the spirit and scope of the invention.

The invention claimed is:

1. A method for processing a microphone signal within an audio system for a number of conflicting applications, the method comprising:

splitting the microphone signal into a number of processing paths, one path corresponding to one application respectively;

processing the split signal in a processing path according to the corresponding application requirement;

identifying common processes within processing paths;

sharing the common processes among the processing paths; and outputting the signal from each processing path for use in the corresponding application, wherein the conflicting applications include two of an ungated signal application, a gated signal application and a sound reinforcement application.

2. The method of claim 1, wherein the audio system has a signal processor, and wherein the processing, identifying and sharing steps are performed in the same signal processor.

3. The method of claim 2, wherein the signal processor is a digital signal processor.

4. The method of claim 1, wherein the audio system has at least two signal processors; and wherein processing the split signal in the processing path according to the corresponding application requirement for the number of conflicting applications is performed in more than one processor.

5. The method of claim 1, wherein the conflicting applications include at least an ungated signal application, a gated signal application and a sound reinforcement application.

6. The method of claim 5, wherein the common processes include parametric equalization, noise cancellation, and automatic gain control.

7. The method of claim 6, wherein the common processes further include acoustic echo cancellation.

8. The method of claim 6, wherein the common processes further include automatic microphone mixing or fader mute.

9. The method of claim 6, wherein the gated signal application includes echo suppression and noise fill process, and excludes feedback elimination process;

wherein the sound reinforcement application includes feedback elimination process and excludes echo suppression and noise fill process; and wherein the ungated process excludes feedback elimination process and echo suppression and noise fill process.

10. The method of claim 5, wherein the conflicting applications includes a customized application.

11. An audio signal processing system operable for processing an audio signal from a signal source within the system for a number of conflicting applications, the audio signal processing system comprising:

a source interface operable to receive the audio signal;

a sink interface operable to send processed signals; and a process module coupled to the source interface and the sink interface;

wherein the process module is operable for, splitting the audio signal into the number of processing paths, one path corresponding to one application respectively;

processing the split signal in a processing path according to the corresponding application requirement;

performing common processes among the processing paths; and sending the signal from each processing path for use in the corresponding application via the sink interface, wherein the conflicting applications include two of an ungated signal application, a gated signal application and a sound reinforcement application.

12. The audio signal processing system of claim 11, wherein the conflicting applications includes at least an ungated signal application, a gated signal application and a sound reinforcement application.

13. The audio signal processing system of claim 12, wherein the common processes include parametric equalization, noise cancellation, automatic gain control.

14. The audio signal processing system of claim 13, wherein the common processes further include acoustic echo cancellation.

15. The audio signal processing system of claim 13, wherein the common processes further include automatic microphone mixing or fader mute.

16. The audio signal processing system of claim 13, wherein the gated signal application includes echo suppression and noise fill process, and excludes feedback elimination process;

wherein the sound reinforcement application includes feedback elimination process and excludes echo suppression and noise fill process; and wherein the ungated process excludes feedback elimination process and echo suppression and noise fill process.

17. A microphone system operable for processing a microphone signal within an audio system for a number of conflicting applications, the microphone system comprising:

a microphone element operable to generate a microphone signal; and a process module coupled to the microphone element;

wherein the process module is operable for, splitting the microphone signal into the number of processing paths, one path corresponding to one application respectively;

processing the split signal in a processing path according to the corresponding application requirement;

performing common processes among the processing paths; and outputting the signal from each processing path for use in the corresponding application, wherein the conflicting applications include two of an ungated signal application, a gated signal application and a sound reinforcement application.

18. The microphone system of claim 17, wherein the conflicting applications includes at least an ungated signal application, a gated signal application and a sound reinforcement application.

19. The microphone system of claim 18, wherein the common processes include parametric equalization, noise cancellation, and automatic gain control.

20. The microphone system of claim 19, wherein the common processes further include acoustic echo cancellation.

21. The microphone system of claim 19, wherein the common processes further include automatic microphone mixing or fader mute.

22. The microphone system of claim 19, wherein the gated signal application includes echo suppression and noise fill process, and excludes feedback elimination process;

wherein the sound reinforcement application includes feedback elimination process and excludes echo suppression and noise fill process; and wherein the ungated process excludes feedback elimination process and echo suppression and noise fill process.

23. An audio system operable for processing a microphone signal for a number of conflicting applications, the audio system comprising:

a microphone element operable to generate a microphone signal;

a loudspeaker operable to reproduce sound;

a number of interfaces operable to couple to audio sinks; and at least one process module coupled to the microphone element, the loudspeaker and the interfaces;

wherein the at least one process module is operable for, splitting the microphone signal into the number of processing paths, one path corresponding to one application respectively;

processing the split signal in a processing path according to the corresponding application requirement;

performing common processes among the processing paths; and outputting the signals to at least the loudspeaker and the interfaces, and wherein the conflicting applications include two of an ungated signal application, a gated signal application and a sound reinforcement application.

24. The audio system of claim 23, wherein the processing, identifying and sharing for all applications are performed in the same process module.

25. The audio system of claim 23, wherein the process module includes a digital signal processor.

26. The audio system of claim 23, comprising, at least a second process module coupled to at least one of the interfaces, wherein the second process module performs the processing, identifying and sharing steps for at least one application.

27. The audio system of claim 23, wherein the conflicting applications includes at least:

an ungated signal application;

a gated signal application; and a sound reinforcement application, whose output signal is sent to the loudspeaker.

28. The audio system of claim 23, wherein the common processes include parametric equalization, noise cancellation, and automatic gain control.

29. The audio system of claim 28, wherein the common processes further include acoustic echo cancellation.

30. The audio system of claim 28, wherein the common processes further include automatic microphone mixing or fader mute.

31. The audio system of claim 28, wherein the gated signal application includes echo suppression and noise fill process, and excludes feedback elimination process;

wherein the sound reinforcement application includes feedback elimination process and excludes echo suppression and noise fill process; and wherein the ungated process excludes feedback elimination process and echo suppression and noise fill process.

32. The audio system of claim 28, further comprising an audio sink coupled to one of the number of interfaces.

33. The audio system of claim 28, wherein the audio sink is a sound recorder, or a broadcast transmitter.

34. The audio system of claim 28, further comprising:

a far site conference unit coupled to one of the interfaces;

wherein the far site conference unit is operable to reproduce sound of the gated signal.

* * * * *